(12) United States Patent
Marrocco et al.

(10) Patent No.: US 11,383,452 B2
(45) Date of Patent: Jul. 12, 2022

(54) APPLICATOR AND METHOD FOR APPLYING A LUBRICANT/SEALER

(71) Applicants: Ford Motor Company, Dearborn, MI (US); ABB Technology AG, Zurich (CH)

(72) Inventors: Alexander Marrocco, Windsor (CA); Hossein Firoozgan, Walled Lake, MI (US); Joosok Jinn, Grosse Ile, MI (US); Isaac Zolotarev, Farmington Hills, MI (US); Arnold Bell, Brighton, MI (US)

(73) Assignees: FORD MOTOR COMPANY, Dearborn, MI (US); ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 16/806,635

(22) Filed: Mar. 2, 2020

(65) Prior Publication Data

US 2020/0198257 A1 Jun. 25, 2020

Related U.S. Application Data

(62) Division of application No. 15/195,110, filed on Jun. 28, 2016, now abandoned.

(51) Int. Cl.
*B29C 65/48* (2006.01)
*B29C 65/56* (2006.01)
(Continued)

(52) U.S. Cl.
CPC .............. *B29C 65/48* (2013.01); *B29C 65/56* (2013.01); *B29C 66/84* (2013.01); *B29L 2031/30* (2013.01); *Y10S 901/43* (2013.01)

(58) Field of Classification Search
None
See application file for complete search history.

(56) References Cited

U.S. PATENT DOCUMENTS

| 3,174,322 A | 3/1965 | Cookson |
| 4,741,078 A | 5/1988 | Kimura |

(Continued)

FOREIGN PATENT DOCUMENTS

| CN | 202668049 U | 1/2013 |
| JP | S6224925 A | 2/1987 |

(Continued)

OTHER PUBLICATIONS

Great Britain Search Report for corresponding Application No. GB1503029.9, dated Jul. 6, 2015, 1 page.
Definition of Coordination; Webster's online.

*Primary Examiner* — Christopher T Schatz
(74) *Attorney, Agent, or Firm* — Vincent Mastrogiacomo; Brooks Kushman P.C.

(57) ABSTRACT

A lubricant/sealer dispenser is disclosed for a component press-in system that includes a pressurized lubricant/sealer reservoir filled with lubricant/sealer. A nozzle is supplied with lubricant/sealer from the reservoir and includes an offset tip formed of PTFE that is enclosed in a steel tube. A controller controls a motor that rotates the nozzle within an opening in a part at a selected depth. The motor rotates the nozzle about a fixed axis and follows an inner surface of the opening as the part is moved by a robot relative to the nozzle in a selected pattern. The nozzle applies the lubricant/sealer by applying the lubricant/sealer onto the inner surface of the opening.

7 Claims, 4 Drawing Sheets

(51) Int. Cl.
  *B29C 65/00* (2006.01)
  *B29L 31/30* (2006.01)

(56) References Cited

U.S. PATENT DOCUMENTS

| | | | |
|---|---|---|---|
| 4,922,852 A * | 5/1990 | Price | B05B 13/0431 |
| | | | 118/683 |
| 5,357,675 A | 10/1994 | Danmoto et al. | |
| 5,761,785 A | 6/1998 | Connolly | |
| 5,940,967 A | 8/1999 | Wuyts et al. | |
| 5,993,592 A | 11/1999 | Perego | |
| 6,228,203 B1 | 5/2001 | Kotoyori et al. | |
| 6,834,428 B2 | 12/2004 | Ravert, Jr. et al. | |
| 7,318,715 B2 | 1/2008 | Markeli | |
| 8,079,143 B2 | 12/2011 | Zhang et al. | |
| 8,342,478 B1 | 1/2013 | Cordray et al. | |
| 8,607,426 B1 | 12/2013 | Coggins et al. | |
| 2002/0029450 A1 | 3/2002 | Kondo | |
| 2002/0100159 A1 | 8/2002 | Swartz et al. | |
| 2007/0141951 A1 | 6/2007 | Naoki et al. | |
| 2008/0283192 A1 * | 11/2008 | Shinohara | B29C 65/521 |
| | | | 156/380.2 |
| 2011/0081486 A1 | 4/2011 | McCamy et al. | |
| 2013/0327104 A1 | 12/2013 | Haselboeck | |
| 2014/0290060 A1 | 10/2014 | Kikukawa et al. | |
| 2015/0066199 A1 | 3/2015 | Shimono | |
| 2015/0352587 A1 * | 12/2015 | Ichino | G03F 7/162 |
| | | | 427/286 |
| 2016/0152102 A1 | 6/2016 | Campbell | |

FOREIGN PATENT DOCUMENTS

| | | |
|---|---|---|
| JP | S6322234 A | 1/1988 |
| WO | 2008087702 A1 | 7/2008 |

* cited by examiner

APPLICATOR AND METHOD FOR APPLYING A LUBRICANT/SEALER

REFERENCE TO RELATED APPLICATIONS

This application is a division of U.S. application Ser. No. 15/195,110 filed Jun. 28, 2016, now abandoned, the disclosure of which is hereby incorporated in its entirety by reference herein.

TECHNICAL FIELD

This disclosure relates to robotic assembly systems and the application of a lubricant/sealer to openings in a part before receiving assembled components that are pressed into the openings.

BACKGROUND

Cylinder-heads, engine blocks, axles, differentials and other assemblies for vehicles and other high volume cast parts were previously manually assembled or assembled with dedicated automation equipment at separate stations. Such cast parts include openings for assembled components including but not limited to caps, spark plug tubes, expansion cups, bearings, and the like. Assembled components are pressed into the openings in the parts by independently controlled press tools.

Some assembly operations for parts such as cylinder heads require application of a lubricant/sealer or lubricant/sealant (i.e. "Loctite™") to lubricate an opening before assembled components are pressed into the opening. One prior method of applying the lubricant/sealer is to apply a low viscosity lubricant/sealer to a spinning disk that is held at a position inside the opening and applying the lubricant/sealer by centrifugal force to the inner diameter of the opening. Different sized spinners must be used for different sized openings in the part with this approach. The use of low viscosity lubricant/sealers may result in objectionable dripping or gaps in the lubricant/sealer application pattern. In addition, dedicated automation systems apply lubricant/sealers in an early operation to, in some cases, twenty openings to provide lubrication for pressing operations that may be two or three stations after the lubrication application operation. Substantial delay after application of the lubricant/sealer allows time for the lubricant/sealer to run down the side of an opening and may potentially result in quality control issues.

This disclosure is directed to solving the above problems and other problems as summarized below.

SUMMARY

According to one aspect of this disclosure, a lubricant/sealer dispenser is disclosed for a component press-in system that includes a pressurized lubricant/sealer reservoir filled with a supply of lubricant/sealer. A nozzle is supplied with lubricant/sealer from the pressurized lubricant/sealer reservoir. A controller controls a motor to position the nozzle within an opening in a part at a selected depth. The motor rotates the nozzle about a fixed axis and follows an inner surface of the opening as the part is moved in a selected pattern by a robot to apply the lubricant/sealer by wicking (applying the lubricant/sealer onto the substrate surface by physical contact with the part) the lubricant/sealer onto the inner surface. The lubricant/sealer dispenser can accommodate a wide range of opening sizes and shapes because rotation of the nozzle is coordinated with movement of the part by the robot.

According to another aspect of this disclosure, the nozzle may include a body portion concentric with the fixed axis of rotation of the nozzle and an offset tip extending radially outwardly from the axis of rotation. The nozzle may be attached to a rotatable bracket with the motor rotating the nozzle with the bracket. The motor may be offset from the axis of rotation of the nozzle and may be connected to the bracket by a drive.

The lubricant/sealer dispenser may further comprise a robot control system for controlling movement of the part by a robot that is also interfaced to control rotation of the nozzle and the flow of lubricant/sealer through the nozzle.

The pressurized lubricant/sealer reservoir may be an anaerobic system that includes a pressure regulator that controls the pressure within the reservoir. The robot controller controls a proportional regulator for the reservoir.

According to another aspect of this disclosure, a method is disclosed for applying a lubricant/sealer to a part prior to pressing components into the part. The method includes the steps of transferring a part, such as a cylinder head, engine block or transmission housing, from a pallet to a lubrication station and rotating a nozzle about a fixed axis while a robot moves the part in a predetermined path following an opening defined by the part. Rotation of the nozzle and moving the part in an orbital path allows the lubricant/sealer to be applied to a wide range of opening sizes and shapes. Lubricant/sealer is supplied to the nozzle and is applied by the nozzle onto an inner surface of the opening.

According to other aspects of the method, the step of transferring the part from a pallet, to a lubrication applicator, and to a pressing tool is performed by a robot. The part may be moved in a circular path within a circular opening or may follow a non-circular path, such as an oval or squared path, if the opening is non-circular.

The method may further comprise moving the part to an assembly location with the lubricant/sealer on the inner surface and pressing a component into the opening. The method may further comprise moving the part repeatedly between the assembly location and the lubrication station. The part may be moved in a path following a second opening in the part to apply the lubricant/sealer from the rotating nozzle onto an inner surface of the second opening.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
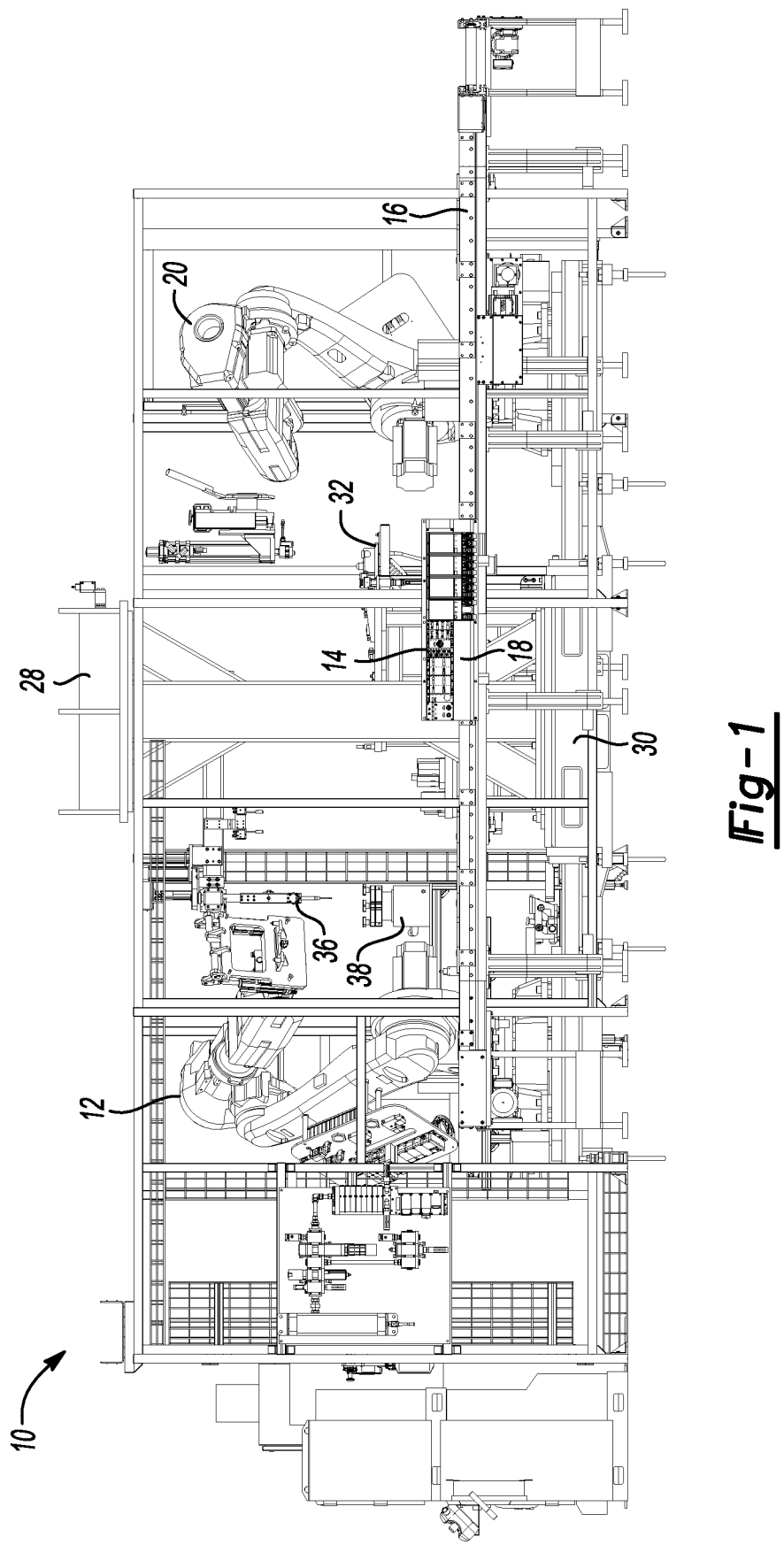
FIG. 1 is a front elevation view of a robotic component press-in system.
Figure 2:
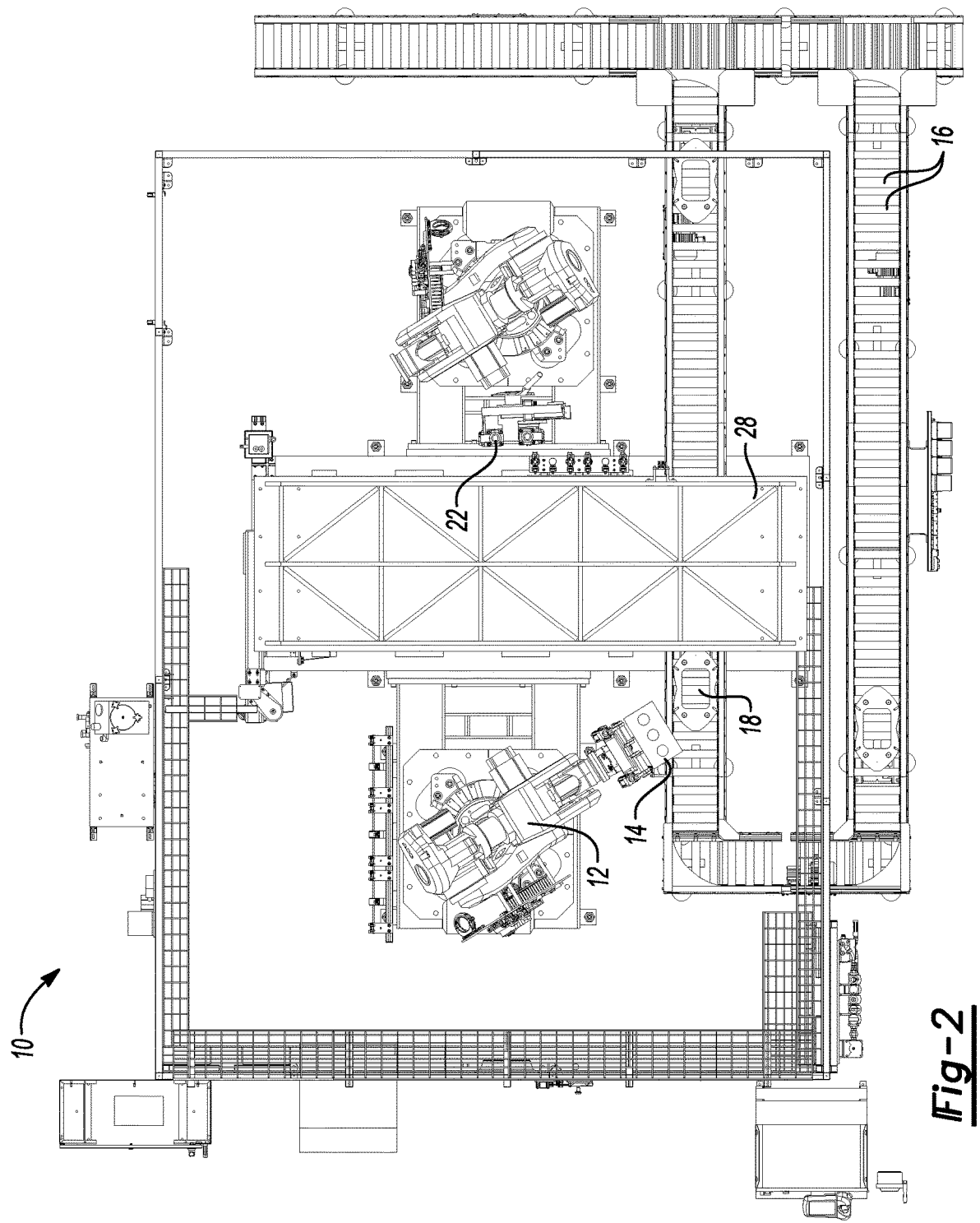
FIG. 2 is a top plan view of a robotic component press-in system.
Figure 3:
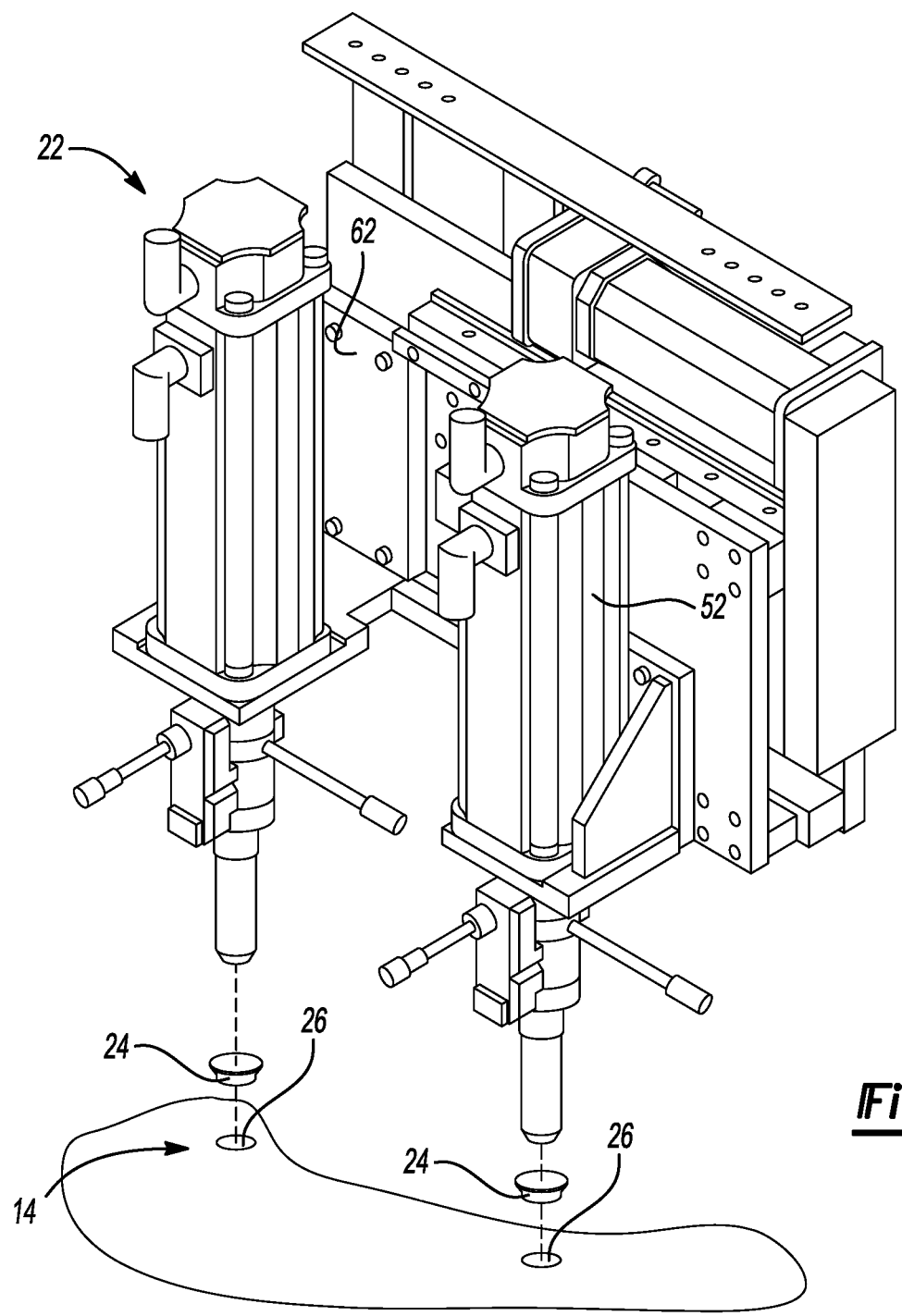
FIG. 3 is a perspective view of a pressing tool attachment for the robotic component press-in system.

Referring to FIGS. 1-3, a component press-in system 10 is shown that may be used to press components such as caps, spark plug tubes, expansion cups, bearings, and the like, into parts such as cylinder-heads, engine blocks, axles, differentials and other assemblies for vehicles and other high volume cast parts. The component press-in system 10 includes a first robot 12 that manipulates a part 14, for example a cylinder head, by taking the part 14 from a conveyor 16 that supplies the part 14 to the system 10 on a pallet 18. As shown in FIG. 3, a second robot 20 is provided with an end effector including a pressing tool 22 for pressing components 24 into openings 26 defined by the part 14.

A reaction force bridge 28 is attached to a base 30 and is used to counteract the reaction force that is created when the pressing tool 22 presses a component 24 into the part 14. A press fixture table 32 supports the part 14 above the base 30 while the pressing tool 22 presses components 24 into the part 14.

A lubricant/sealer applicator 36 is shown as part of the system 10 in FIGS. 1 and 2 that receives lubricant/sealer from a lubricant/sealer reservoir 38. The fluid reservoir 38 is pressurized and provides an anaerobic flow of a lubricant/sealer such as Locktite™. The lubricant/sealer applicator 36 is described in greater detail below with reference to FIGS. 4 and 5.

Referring to FIG. 3, the pressing tool 22 is manipulated by the second robot to select components 24 from a tray (not shown) that is part of the pallet 18, shown in FIG. 1, used to transport the part 14. The pressing tool 22 is provided with quick connect tool changers (not shown) and selects a pressing tool from a magazine (not shown) that corresponds to the component 24 to be pressed into the part 14. The pressing tool 22 may have one or more press actuators 39 that include vacuum or mechanical systems for retaining the tool and the components 24 as they are moved into position to be pressed into the part 14.

Figure 4:
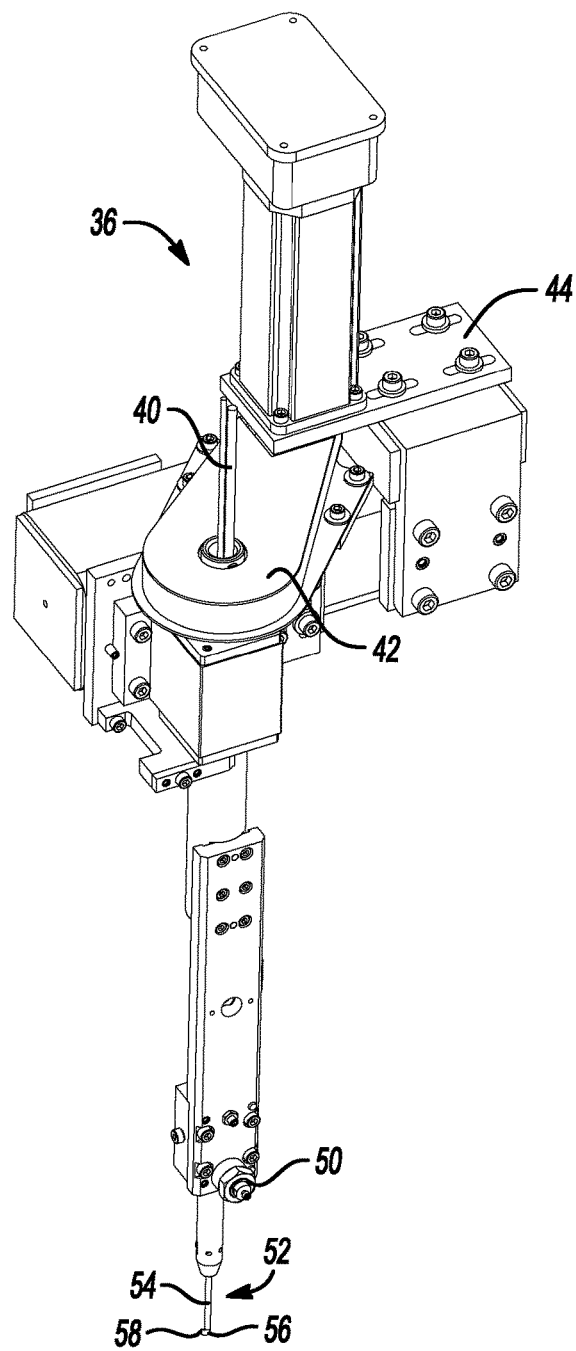
FIG. 4 is a perspective view of a lubricant/sealer applicator robotic component press-in system.
Figure 5:
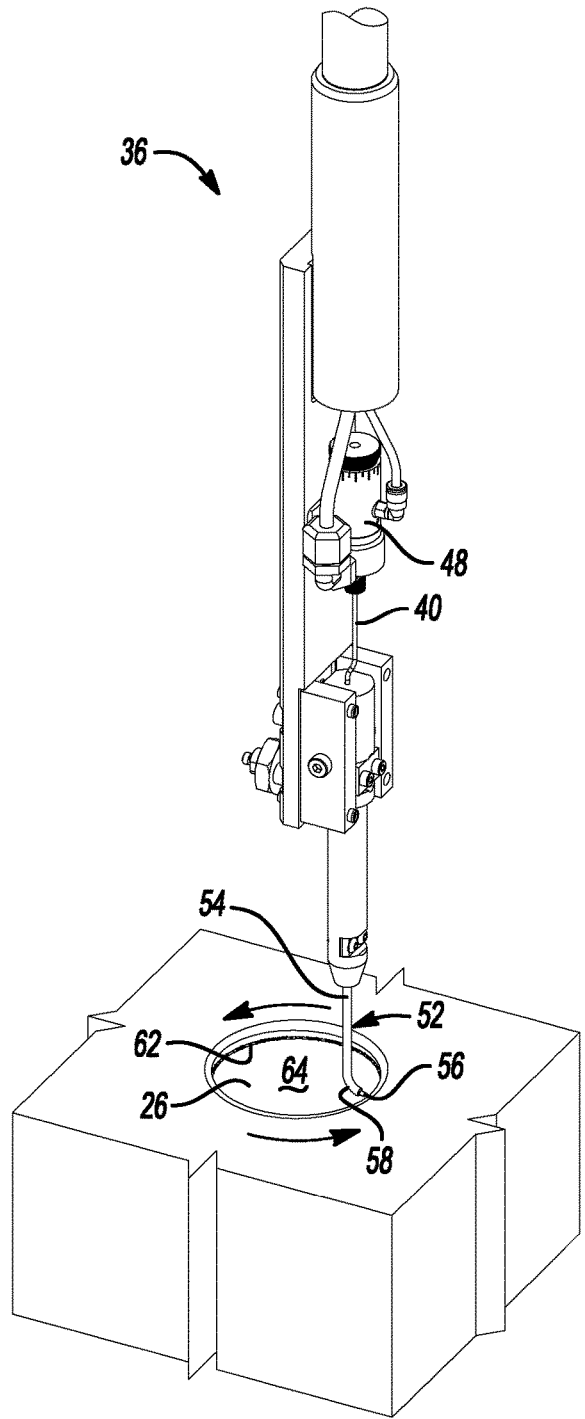
FIG. 5 is a perspective view of a lubricant/sealer applicator of FIG. 4 shown applying a lubricant/sealer to a part.

Referring to FIGS. 4 and 5, a lubricant/sealer supply tube 40 provides the lubricant/sealer to the lubricant/sealer applicator 36 from the reservoir 38. A drive 42 is provided to rotate the lubricant/sealer applicator 36. The lubricant/sealer applicator 36 is attached by a bracket 44 to a beam or frame of the component press-in system 10.

The lubricant/sealer applicator 36 includes an on/off valve 48 for controlling the flow of the lubricant/sealer through the applicator 36.

A spring assembly 50 retains a nozzle 52 resiliently to allow the nozzle to flexibly engage the part 14. The nozzle 52 includes a steel tube 54 containing and supporting a polytetrafluoroethylene (PTFE) tube 56 that contacts the opening 26 in the part 14 to apply a bead 62 of lubricant/sealer directly on the part 14 by applying the lubricant/sealer on a sidewall of the opening 26. The soft PTFE tube prevents scratching the inner surface 64, or sidewall, of the opening 26.

The nozzle 52 rotates about a fixed axis of rotation while the part 14 is moved by the first robot 12 in a path that follows the sidewall 64 in a continuous path. This arrangement allows the nozzle 52 to apply the lubricant/sealer to the surface of a larger opening with the axis of rotation being within the opening 26. For openings that are smaller than the radial size of the nozzle 52, the part 14 may be manipulated with the axis of rotation of the nozzle 52 being disposed outside the opening 26 with only the tip of the tube 56 extending into the opening 26. The single nozzle feature is enabled by the coordinating the movements of the nozzle 52 and movement of the part 14 by the first robot 12.

Rotation of the nozzle 52 and orbital movement of the part 14 are coordinated by a single robot controller that may be programmed to include the location and size of the openings 26 for a part 14. Alternatively, the robot controller may have a look-up table that is referenced for particular opening 26 parameters such as the location and size of the openings 26. The robot controller also controls tool and component 24 selection and the pressing operation.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of applying a lubricant to a part comprising:
transferring a part from a pallet to a lubrication station;
rotating a nozzle about a fixed axis;
moving the part in a path with the nozzle following a first opening defined by the part; supplying the lubricant to the nozzle; applying the lubricant from the nozzle onto an inner surface of the first opening, moving the part to a pressing tool with the lubricant on the inner surface of the first opening;
pressing a component into the opening;
moving the part from an assembly location to the lubrication station;
rotating the nozzle about the fixed axis;
moving the part in a second path following a second opening defined by the part;
supplying the lubricant to the nozzle; and
applying the lubricant from the nozzle onto an inner surface of the second opening.

2. The method of claim 1 further comprising:
retaining the part with a robot during the transferring step and moving the part with the robot in the path relative to the nozzle during the applying step.

3. The method of claim 1 wherein the path is a circular path within the first opening in the part, and wherein the first opening in the part is circular.

4. A method of applying a lubricant to a part comprising:
transferring a part from a pallet to a lubrication station;
rotating a nozzle about a fixed axis;
moving the part in a path with the nozzle following a first opening defined by the part; supplying the lubricant to the nozzle; applying the lubricant from the nozzle onto an inner surface of the first opening;
the part defining a second opening; and
applying the lubricant from the nozzle onto a second inner surface of the second opening defined by the part.

5. The method of claim 1 wherein the part is moved by a robot in the transferring step, and wherein the robot moves the part along the path following the first opening.

6. The method of claim 1 further comprising:
flexing the nozzle against a biasing force applied by a spring that biases the nozzle into engagement with the inner surface of the first opening.

7. The method of claim 1 further comprising:
controlling lubricant flow to the nozzle with a valve that opens and closes to control the lubricant flow to the nozzle wherein the lubricant flow is specific to the size of the opening.

* * * * *